United States Patent
Kinnunen et al.

(10) Patent No.: US 6,545,995 B1
(45) Date of Patent: Apr. 8, 2003

(54) MAINTENANCE OF GROUP CALL IN MOBILE COMMUNICATION SYSTEM

(75) Inventors: Kimmo Kinnunen, Äänekoski (FI); Osmo Schroderus, Sumiainen (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/319,195

(22) PCT Filed: Dec. 2, 1997

(86) PCT No.: PCT/FI97/00750
§ 371 (c)(1),
(2), (4) Date: Jun. 29, 1999

(87) PCT Pub. No.: WO98/25423
PCT Pub. Date: Jun. 11, 1998

(30) Foreign Application Priority Data

Dec. 2, 1996 (FI) .............................................. 964817 U

(51) Int. Cl.[7] .......................... H04Q 7/28; H04Q 7/20; H04B 7/212; H04B 7/00
(52) U.S. Cl. ...................... 370/341; 370/340; 370/348; 455/518
(58) Field of Search ................................ 455/518, 519, 455/404, 527, 528, 521; 370/340, 341, 345, 347, 348, 468, 329

(56) References Cited

U.S. PATENT DOCUMENTS

| | | | | |
|---|---|---|---|---|
| 4,692,945 A | * | 9/1987 | Zdunek ........................ | 370/348 |
| 5,025,442 A | | 6/1991 | Lynk et al. | |
| 5,126,733 A | * | 6/1992 | Sagers et al. ................ | 455/518 |
| 5,282,204 A | * | 1/1994 | Shpancer et al. ............ | 370/341 |
| 5,287,552 A | * | 2/1994 | Sasuta et al. ................ | 455/528 |
| 5,473,605 A | | 12/1995 | Grube et al. | |
| 5,542,108 A | | 7/1996 | Sasuta | |
| 5,634,197 A | * | 5/1997 | Paavonen ..................... | 455/518 |
| 5,781,583 A | * | 7/1998 | Bruckert et al. ............. | 370/468 |
| 5,901,363 A | * | 5/1999 | Toyryla ........................ | 455/527 |

FOREIGN PATENT DOCUMENTS

| | | | | |
|---|---|---|---|---|
| EP | | 0778680 | 6/1997 | |
| WO | | WO 91/09481 | 6/1991 | |
| WO | | WO 93/07723 | 4/1993 | |
| WO | | 94/17642 A1 | * 8/1994 | ................ 455/518 |
| WO | | WO 95/05721 | 2/1995 | |

OTHER PUBLICATIONS

"A Signalling Standard for Trunked Private Land Mobile Radio Systems"; *MPT 1327*; Jan. 1988; issued by Radio Communications Agency, published by the British Department of Trade and Industry.

(List continued on next page.)

*Primary Examiner*—Nay Maung
*Assistant Examiner*—Ray Persino
(74) *Attorney, Agent, or Firm*—Squire, Sanders & Dempsey L.L.P.

(57) ABSTRACT

A method of maintaining a group call in a mobile communication system comprising a network infrastructure and mobile stations, the method comprising the steps of: establishing a group call in which a first mobile station is prioritized and the mobile stations participating in said group call communicate in speech items, the frame structure comprising time slots that a second mobile station sending a speech item employs in its speech item. In the method, the first mobile station is allocated time slots or time periods in which only the first mobile station can transmit signalling messages to the network infrastructure; the first mobile station and the third mobile stations are transmitted data indicating in which time slots of time periods only the first mobile station can send signalling messages to the network infrastructure; and the third mobile stations refrain from sending their signalling messages in the time slots or time periods allocated to the first mobile station.

23 Claims, 3 Drawing Sheets

OTHER PUBLICATIONS

"Performance Specification: System Interface Specification for radio units to be used with commercial trunked networks operating in Band III sub–bands 1 and 2"; *MPT 1343*; Jan. 1988; issue by Radio Communications Agency; published by the British Department of Trade and Industry.

"Radio Equipment and Systems (RES); Trans–European Trunked Radio (TETRA); Voice plus Data (V+D); Part 2: Air Interface (AI)"; *European Telecommunications Standards Institute*; ETS 300 391–2; Mar. 1996; 583 pages.

\* cited by examiner

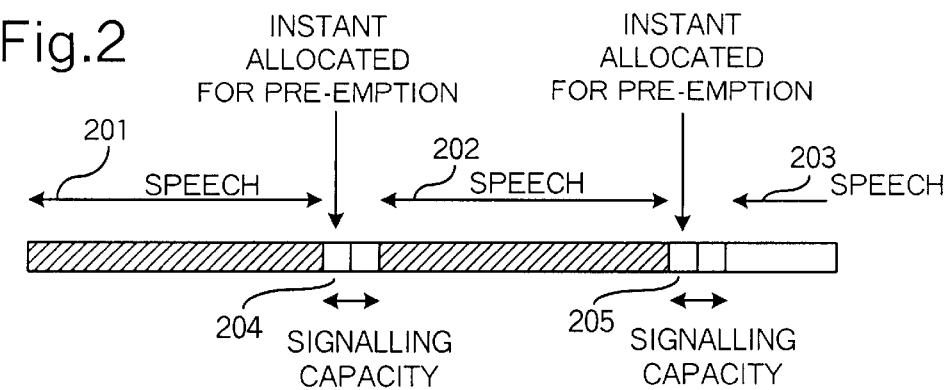
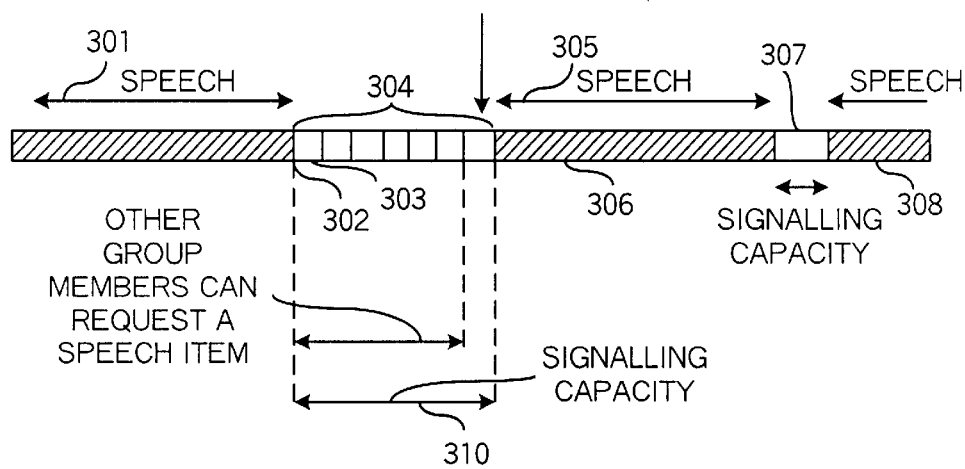
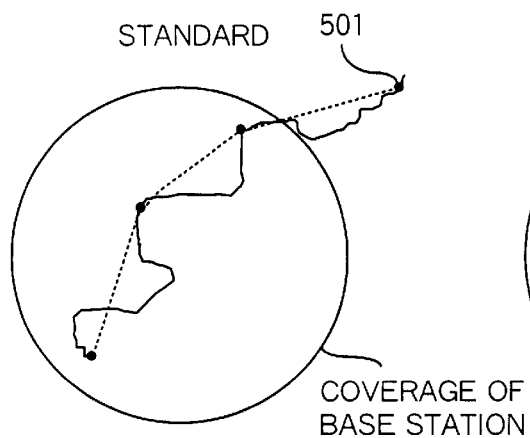
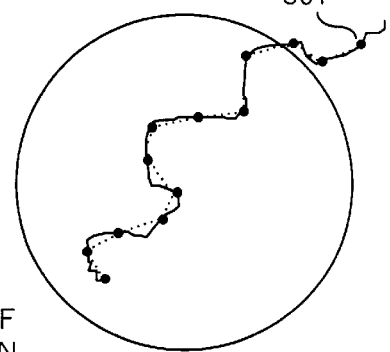

MAINTENANCE OF GROUP CALL IN MOBILE COMMUNICATION SYSTEM

This application is based on patent application no. 964,817 filed in Finland on Dec. 2, 1996. The content of the Finnish priority application is incorporated herein by reference.

FIELD OF INVENTION

The invention relates to a method of maintaining a group call in a mobile communication system comprising:
- a network infrastructure, and mobile stations that communicate with the network infrastructure over a radio path, whose frame structure comprises time slots,
- the method comprising the steps of:
  - establishing a group call in which a first mobile station is prioritized, the mobile stations that participate in the group call communicating in speech items, and the frame structure comprising time slots that a second mobile station sending a speech item employs in its speech item.

BACKGROUND OF INVENTION

The method of the invention is intended for use particularly in PMR (Private Mobile Radio or Professional Mobile Radio) networks, or trunking networks, which are typically company networks or private mobile radio networks used by authorities, all the channels in these networks being allocated to one or more companies or authority organizations. In addition to subscriber numbers, the subscribers in these networks have been assigned group numbers indicating to which group call group or subscriber group the subscriber belongs. It is thus possible to switch calls directed to the members of a certain group to all the subscribers of this group.

A group call is one of the key functions in a PMR network. A group call is used when several participants are involved, particularly when an entire group must continuously know how things proceed. A group call is a conference call in which all participants can take turns to speak, or transmit speech items, and to listen to each other. In group calls the whole group is called by one group identity code. It is known that many mobile telephone systems, particularly systems used by companies and authorities, apply group calls. As regards the radio path, a group call is typically implemented in simplex form as a point-to-multipoint call, in which speech is transmitted from one talking party to multiple talking parties, and a speech item is allocated to a next talking party according to a predetermined practice. It is naturally also possible to implement a group call as a duplex call.

A call or a group call is here taken to mean complete exchange of information between two or more parties. A call may consist of one or more speech items. In a semi-duplex call, these speech items are sequential ones.

The invention is applicable in mobile communication systems with either digital or analogue radio paths. Analogue mobile communication systems are described, for example, in MPT 1327, *A Signalling Standard for Trunked Private Land Mobile Radio Systems*, January 1988, revised and reprinted November 1991, and MPT 1343, *Performance Specification*, January 1988, revised and reprinted September 1991, both issued by the Radio-communications Agency, published by the British Department of Trade and Industry.

An example of a digital mobile telephone or mobile communication system in which the invention can be applied is the TETRA system (Trans-European Trunked Radio). Its implementation is described in the standard ETS 300 392-2, *Radio Equipment and Systems* (RES); *Trans-European Trunked Radio* (TETRA); *Voice plus Data* (V+D) *Part 2:Air interface* (AI), Mar. 20, 1996, ETSI, 583 pages. In this system, the allocation of speech items is controlled by a Switching and Management Infrastructure (SWMI) through base stations connected to it.

In FDMA systems (Frequency Division Multiple Access), the facility of sending signalling messages or other data during calls or data calls is called in-band signalling. In this system, part of the transmission capacity of the channel is typically used during the call for signalling that supplants actual speech or circuit-switched data.

WO A1 91/09481 describes traffic between a first and a second communication unit in a quasi-duplex situation, for example on a direct mode channel. The first communication unit transmits a signal with periodically-occurring holes therein, the signal also comprising a speech information portion and information packets that inform of the location of the next hole. The receiving, second communication unit sends an interrupt request signal to the first communication unit in the hole indicated by the information packet. The first communication unit receives the interrupt request signal and processes it, and if the first communication unit determines that the interrupt request signal complies with (desired) predetermined criteria, it sends an acknowledgement to the receiving second communication unit. The acknowledgement informs the second communication unit that the first communication unit will interrupt transmission (for a predetermined period of time) and thereby allow the receiving second communication unit to start a transmission. The second communication unit can thus start the transmission.

U.S. Pat. No. 5,025,442 teaches a quasi-duplex mobile telephone system employing a control time slot during which a receiving communication unit is allowed to interrupt the transmission of a transmitting communication unit by sending the transmitting communication unit an interrupt signal by which the transmitting communication unit is instructed not to transmit.

It is also known that part of the traffic capacity allocated to a user is permanently allocated for signalling. This procedure is called out-band (channel-specific) signalling.

In common mobile telephone networks, such as NMT (Nordic Mobile Telephone) or GSM (Global System for Mobiles) systems, typically all calls have the same priority, i.e. no user is prioritized over any other user.

In private radio networks, i.e. trunking networks, the situation is different. The operation of these PMR networks can be arranged in such a way that users performing certain type—e.g. emergency—servicing or other important duties have a higher priority, i.e. their high priority call is switched first in the event of congestion.

An example for a high priority call is an emergency call, i.e. a call established when at least one subscriber needs immediate help. The subscriber in an emergency can activate an emergency call, or the activation can be performed by some other subscriber station or by a dispatcher controlling the operation. The emergency call can be addressed to a talk group, i.e. a group call, whereby the members of the talk group need not just listen to the conversation but they can also participate in it. In other words, the members send speech items. This is often necessary, for example, when instructions are given to a group member in an emergency. However, the subscriber requiring a communication connection in an emergency should always be allocated a speech item as soon as possible in a group call where several users take turns to speak.

In a mobile telephone system based on a trunking method, the mobile station, however, has to request a speech item from the system, and the system allocates the speech item in order of time or priority. The system is also able to interrupt an ongoing speech item.

A problem in the prior art is that the control channel capacity of a prior art mobile communication system protocol, particularly of the TETRA mobile telephone system, is very limited during speech items in individual calls of a single base station and in group calls at the base station that the subscriber station sending a speech item is attached to. During the speech item, only the 18th frame of the TETRA frame structure has available a Slow Associated Control Channel, i.e. a once-a-second time slot. Particularly in private mobile radio networks which are used by authorities and in which emergency group calls are sent frequently, it is essential that a subscriber or mobile station in an emergency is given a chance to request a speech item sufficiently often during a speech item sent by a subscriber participating in a group call, so that the speech item request is reasonably likely to be successful.

In prior art solutions, particularly in the TETRA system, a Slow Associated Signalling Channel is used so that all mobile stations participating in a group call can request a speech item using a random access method, such as a first-try procedure, by sending speech item request signals.

A problem arises when a second mobile station is sending a speech item and several third mobile stations participating in an emergency group call, as well as a first mobile station actually in an emergency, simultaneously request a speech item in the time slot of the 18th frame reserved for a speech item request, or in a part of the time slot. It is then likely that it is one of the third mobile stations that succeeds in sending a speech item request, rather than the first mobile station, i.e. the one in an emergency. For example, a transmission request from a third mobile station may collide with the speech item request sent by the first mobile station. The first mobile station, i.e. the one in an emergency, is then not able to deliver its speech item request to the network infrastructure, and so a speech item will not be allocated to the first mobile station in an emergency.

One way of solving the problem is to allocate a separate uplink channel, time slot or frequency to a prioritized mobile station, so that a speech item request can be delivered immediately. A problem of this solution is that it wastes radio resources. It should be noted that when a subscriber is in an emergency or is prioritized, the traffic density is also otherwise likely to be higher than normal. In addition, allocation of a separate uplink channel to a prioritized user is a complicated non-standard procedure for a network infrastructure.

Another way of solving the above problem is to allow a prioritized mobile station to send a speech item request on a Common Control Channel. A problem is that a prioritized mobile station has to wait for its transmission turn on the control channel, and that in so doing the prioritized mobile station is not on a traffic channel, whereby it may lose a call or at least not receive part of the transmission of a transmitting mobile station.

Another problem in the prior art solutions is that when a speech item is terminated in a prioritized group call, there begins a random access time, during which the mobile stations participating in the group call can request a speech item. It may then happen that the speech item requests of the third mobile stations collides with the speech item request made by the first, prioritized mobile station, and the first mobile station cannot therefore be quickly allocated the speech item it needs. This has particular significance in private mobile radio networks used by authorities, where it must be ensured that a speech item request from a prioritized mobile station, potentially in an emergency, is reasonably likely to succeed.

BRIEF DESCRIPTION OF INVENTION

The object of the present invention is to solve the above problem of the prior art.

The object of the present invention is to provide a method by which it can be ensured that speech item requests sent by a prioritized mobile station, e.g. a mobile station in an emergency, participating in a prioritized call actually reach the network infrastructure, which can allocate a speech item precisely to the prioritized mobile station after receiving the speech item request.

This new method of maintaining a group call is achieved with a method of the invention, the method being characterized by further comprising the steps of:
  allocating only to the first mobile station time slots or time periods in which only the first mobile station may send signalling messages to said network infrastructure,
  sending the first mobile station and the third mobile stations data indicating in which time slots or time periods only the first mobile station may send signalling messages to said network infrastructure,
  the third mobile stations refraining from sending their signalling messages in said time slots or time periods allocated to the first mobile station.

The invention also relates to a mobile communication system comprising:
  a first, a second and third mobile stations, a mobile exchange for relaying group calls and transmissions and for maintaining a group call, said mobile stations that participate in said group call communicating in speech items,
  a base station for maintaining a frame structure comprising time slots that the second mobile station sending a speech item employs in its speech item.

The mobile communication system of the invention is characterized by further comprising:
  allocation means for allocating time slots or a time period only to the first mobile station so that only the first mobile station can send signalling messages in certain time slots or time periods to said mobile exchange,
  transmission means for sending the first mobile station and the third mobile stations data in a control message indicating in which time slots or time periods only the first mobile station may transmit,
  control means in said third mobile stations for preventing transmission of signalling messages in said time slots or time periods allocated to said first mobile station.

The invention also relates to a mobile station of a mobile communication system, communicating in a group call, the mobile station comprising: a transceiver for sending transmissions in a frame structure comprising: time slots that a second mobile station sending a speech item in the group call employs in its speech item, and time periods that are common to the mobile stations that are not sending a speech item, for transmitting signalling messages to the network infrastructure; a control unit; a user interface; and a memory unit.

A mobile station of the invention is characterized in that said mobile station comprises a control unit, responsive to a control message sent by said mobile communication system, for preventing transmission of signalling messages in the time slots or time periods allocated to a first mobile station and indicated in said control message.

A mobile station of the invention can also be characterized in that, in response to a control message sent by said mobile communication system, the transceiver of the mobile station is arranged to send a signalling message during the time period indicated in the control message.

The invention is based on the idea of ensuring that a participant of a prioritized group call, for example a mobile station that has activated an emergency call, is assigned signalling capacity at certain intervals, so that said mobile station has a chance of sending a speech item request, and on the other hand so that the mobile station sends the system an indication of its presence on a continuous basis. This is done by allocating a random access time slot of the frame structure to the first, prioritized mobile station, and by preventing the other, third mobile stations that participate in the same call from transmitting during a time period of the frame structure that is allocated to the first mobile station. In the invention, the first, prioritized mobile station, which is the one in an emergency, and the third mobile stations, participating in the prioritized group call, are sent data indicating the time slots or time periods in which only the first mobile station is allowed to send signalling messages to said network infrastructure.

The advantage of the method, mobile communication system and mobile station of the invention is that the invention ensures that, for example, a mobile station in an emergency, particularly a prioritized mobile station, can send a speech item request, and that when the mobile station sends the speech item request, the request also reaches the network infrastructure, which is then able to allocate the next speech item to the prioritized mobile station, for example to one in an emergency.

BRIEF DESCRIPTION OF FIGURES

In the following the invention will be described in greater detail with reference to the attached drawings, in which FIG. 2 shows a timing diagram of a group call prioritized according to a first embodiment of the invention, FIG. 3 shows a timing diagram of a group call prioritized according to a second embodiment of the invention, FIG. 5 shows a schematic view of a situation in which a prioritized mobile station is given a chance of transmitting position data at frequent intervals in accordance with the invention.

DETAILED DESCRIPTION OF INVENTION

Figure 1:
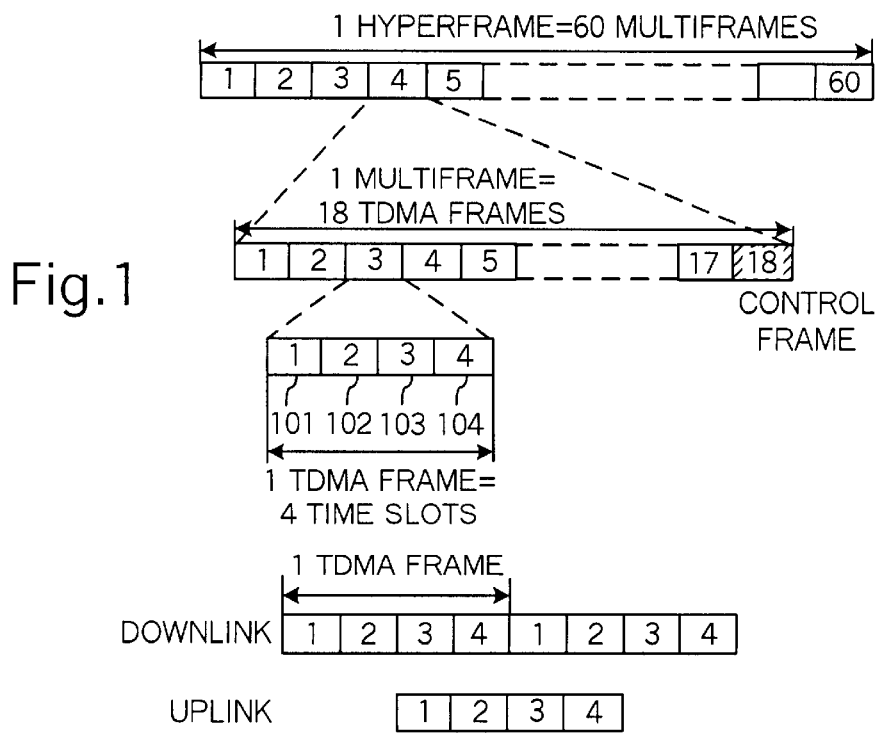
FIG. 1 shows a frame structure of the TETRA mobile telephone system.

FIG. 1 shows a frame structure of the TETRA mobile telephone system. In a TETRA protocol, the uplink frequency (from mobile station to base station) on system channels is delayed by two time slots from the downlink (from base station to mobile station). The system comprises main radio frequencies with a main signalling channel and possible other signalling channels and traffic channels.

In the TETRA frame structure, one hyper frame comprises 60 multiframes, each one of which comprises 18 TDMA frames. Each TDMA frame is divided into four time slots, 101 to 104 in the figure. According to the TETRA standard, a time slot or part of a time slot, a time period, for example half a time slot, in the 18th frame of a multiframe is allocated as an uplink signalling channel, and the other time slots of the frame concerned, for example 101, 103 and 104, can be allocated as traffic channels. In the figure, multiframes are indicated by 1 to 60, frames by 1 to 18, and time slots by 1 to 4.

FIG. 2 shows a timing diagram of a group call prioritized according to a first embodiment of the invention. At the beginning of the operation a user indicates an emergency to the system. The user giving the indication can himself/ herself be in an emergency, or he/she can be, for example, a dispatcher detecting that a mobile station requested to participate in a group call is in an emergency. The system operates in accordance with an emergency call procedure: for example, it allocates a speech item to the mobile station that activated the emergency call, and routes the call to an emergency exchange. The method of the invention relates to a situation where an emergency call turns into a group call in which other members of the group also have a chance to speak. When some other mobile station of the talk group than the one that is in an emergency and is to be prioritized, i.e. for example a second mobile station, sends a speech item 201, 202, 203, then the one in an emergency, i.e. the first, prioritized mobile station, must be able to pre-empt a group member's speech item, if necessary.

FIG. 2 shows, hatched, the successive time slots of a certain uplink connection or channel in which the second mobile station sends its speech item 201, 202, 203. In FIG. 1, for example, the time slots in the first seventeen frames of a multiframe are the same time slot, for example time slot 102. The pre-emption of a prioritized mobile station is implemented as follows: the system notifies the prioritized mobile station and the third mobile stations, i.e. the other mobile stations listening to the speech item of the second mobile station, that the first mobile station has been allocated a time slot or time period 204, 205 in which the mobile station can transmit a speech item request. The notification is performed by transmitting a signalling message at least to the first mobile station and the third mobile stations. In response to the notification, the third mobile stations refrain from transmitting their signalling messages in the time slots or time periods allocated to the first mobile station.

In accordance with the present invention, the first mobile station can be required to send an empty transmission, for example a Null PDU (Protocol Data Unit), if it has nothing else to send in the time slot or time period 204, 205 concerned, i.e. no speech item request or any other signalling message. This makes it possible to achieve the third object of the invention: a prioritized mobile station, for example one in an emergency, is forced to announce its existence on a continuous basis.

If necessary, the first mobile station can send positioning data in the time slot or time period 204, 205 allocated to it. The geographical location of the mobile station concerned can then be determined on the basis of the data. The positioning data can be, for example, GPS (Global Positioning System) position coordinate data. On the basis of the position data, the positioning system connected with, for example, a mobile communication system or its dispatcher can announce the location of the first, prioritized mobile station every time the mobile station sends location data. A change in the location of the first mobile station, i.e. its movements, can thus be monitored.

The part of a frame structure allocated to the first mobile station for transmission of speech item requests can be a whole time slot, a time period consisting of several time slots or one part of a time slot.

The method according to the first embodiment of the invention comprises at least the following steps:

At first a group call is established so that the frame structure of the mobile communication system comprises, between normal communication time slots, time periods that are common to the first mobile station and the third mobile stations for transmission of signalling messages to the network infrastructure. This concerns a situation in which the second mobile station is sending a speech item, and the first, prioritized mobile station wants to be allocated the next speech item.

In the allocation step that follows, one or more of the common time periods are allocated only to the first mobile station for transmission of signalling messages. It is thus decided that a time slot of certain frames, for example of the 18th frames in the frame structure, is allocated to be used only by the first mobile station for transmission of signalling messages.

The network infrastructure sends the first mobile station and the third mobile stations a notification of the allocation, and in response to the notification the third mobile stations refrain from sending their transmissions during the time period concerned.

FIG. 3 is a timing diagram of a group call prioritized in accordance with a second embodiment of the invention. The embodiment is a modification of the above-described first embodiment, and all that is stated above in connection with the first embodiment also applies to this embodiment, unless specifically stated otherwise. The second embodiment concerns a situation where the second mobile station has used up its speech item 301 and terminated it 302. In the prior art, when a speech item is terminated, the mobile stations listening to the channel are usually allowed random access. The mobile stations listening to the channel can then send speech item request sianals or other signalling messages. The aim is allocation of a new speech item. A prioritized mobile station is in a special situation in the respect that if it needs to initiate a speech item, it must be allowed to initiate it as soon as possible. The reason for this is that the prioritized mobile station can be in an emergency situation and need help, and is therefore requesting help. The prioritized mobile station may also have requested that an emergency call should be set up.

FIG. 3 shows a situation where pre-emption becomes possible for all mobile stations of a group call immediately as the preceding, second, mobile station has terminated its speech item. The pre-emption situation is brought about as follows: the network infrastructure of the mobile communication system allocates a certain number of first time slots or time periods 304 to the first mobile station and at least the third mobile stations participating in the group call for transmission of random access and signalling messages. In addition, the system allocates second time slots 305 of the frame structure only to the first, or prioritized, mobile station, for transmission of signalling messages, typically of a speech item request. The first, or prioritized, mobile station and the third mobile stations participating in the group call are notified of the allocation. The second mobile station, which has terminated a speech item, can also be notified. The notification of the allocation contains at least data indicating in which time slots or time periods only the first mobile station can send signalling messages. To a prioritized mobile station optionally in an emergency is allocated a time slot or time period, e.g. half a time slot, in which only this prioritized mobile station can send a speech item request. This is implemented in such a way that it is possible for a prioritized user, for example a user in an emergency, not to want to pre-empt a preceding call and yet want to be allocated the next speech item.

If the first mobile station were allocated the first free time slot or time period after the second mobile station has terminated its speech item 302, then the pre-emption situation 303 would occur too early, since the user's reaction to the termination of a speech item is slightly delayed (e.g. half a second) from the moment when the user detects the allocation of a time slot. It is naturally possible to allocate a time slot to the first mobile station immediately as the speech item of the second mobile station has been terminated, or in any other free time slot or time period.

A next speech item 306 follows the time slot or time period 305 allocated to the first mobile station for transmission of signalling messages. If the first, prioritized mobile station has requested a speech item, it may be allocated the next speech item 306. Otherwise some other mobile station that has requested a speech item is allocated the next speech item 306. After the next speech item, there follows a new time slot or time period 307 of the frame structure, in which any mobile stations except the one sending a speech item can transmit their signalling messages to the network infrastructure. If so defined in the data sent by the network infrastructure, even this time slot or time period can still remain allocated to the first mobile station for transmission of signalling messages.

FIGS. 2 and 3 show the use of several random access frames for allocation of speech items. After the last speech item, a time slot is reserved for the prioritized mobile station for transmission of a speech item request. The random access frame can be a TDMA time slot or a part of such a time slot.

In the second embodiment of the invention, at least the following steps are taken. When the second mobile station, which has been sending a speech item, terminates its speech item, the third mobile stations participating in the group call are allocated, for transmission of signalling messages, a desired number or time slots or time periods from a time period of the frame structure that is of a desired length.

In addition to this, from said time period of a desired length is allocated a time period only to the first mobile station for transmission of signalling messages. These signalling messages can be, for example, speech item request signals, status messages, messages informing of the location of the mobile station, or empty messages.

After this, the mobile stations participating in the group call are sent a first notification to the effect that certain time slots or time periods of the frame structure are allocated to the mobile stations participating in the group call. The notification informs the mobile stations participating in the group call that certain time slots are available to all the mobile stations of the group for transmission of signalling messages.

The first mobile station is then sent a second notification to the effect that a certain second time period of the frame structure is allocated only to the first mobile station for transmission of signalling messages. Naturally, there can be more than one first mobile station.

In response to the first notification, the mobile stations participating in the group call can then send a signalling message during the above-mentioned time slots or time periods.

Further, in response to the second notification, the first mobile station can send a transmission during the time period allocated to it.

In the first and second embodiments of the invention, in response to the allocation data sent by the network infrastructure, the third mobile stations store in their memory data indicating which time period of the frame structure is allocated to the first mobile station.

Figure 4:
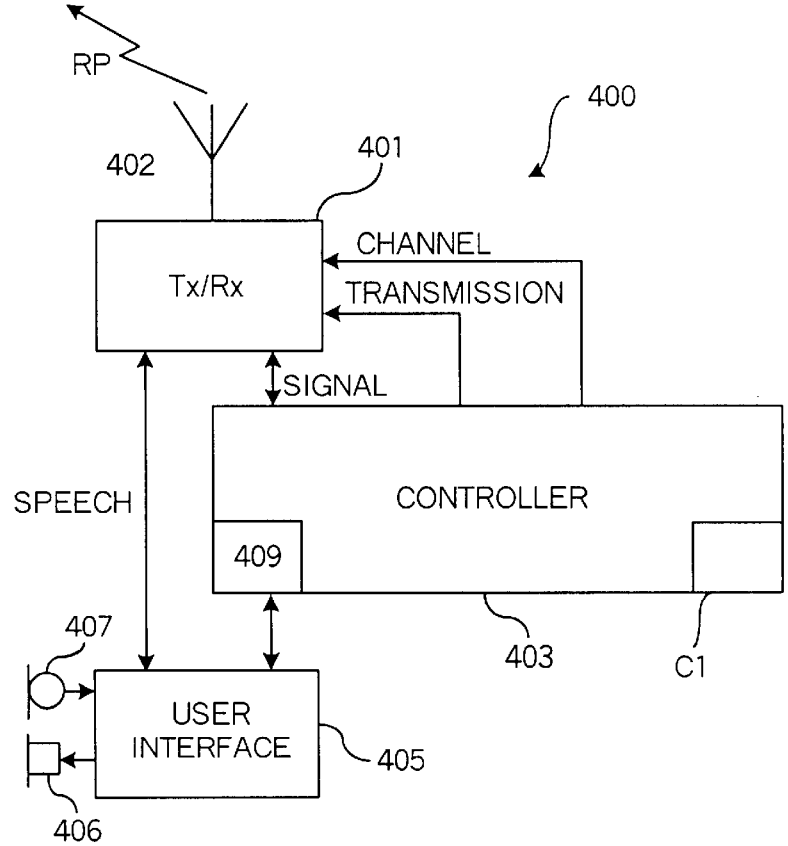
FIG. 4 shows a block diagram of a mobile station of the invention.

FIG. 4 is a block diagram of a mobile station of the invention. FIG. 4 shows a typical communicating radio unit 400, i.e. a mobile phone, mobile station or e.g. a subscriber station used by the subscriber. The function of a transceiver (TX/RX) 401 is to tune to the channel used. The transceiver 401 communicates with base stations or repeater stations at the radio frequency, i.e. a radio frequency divided into TDMA frames and further into time slots, at least one of which can be allocated to one or more mobile stations as a traffic channel. To the transceiver 401 is connected an antenna 402, which is connected with the radio path RP. Usually, radio frequencies in the range of 60 to 1000 MHz (VHF and UHF ranges) are used, but other frequencies are also possible. On the radio path RP, analogue modulation can be used, the modulation then being usually phase modulation. Other kinds of modulation can also be used. Signalling can be transmitted e.g. by a voice-frequency subcarrier wave (FFSK). Transmission over a radio path can also be digital. The radio unit can tune to and communicate at uplink and downlink frequencies.

A user interface 405 comprises electroacoustic transducers, typically a headphone 406 and a microphone 407, and optionally buttons for starting and ending a call, and for dialling. Since transmission over the radio path RP is advantageously unidirectional in a trunked system, the subscriber station usually also has a push-to-talk button that must be depressed for the duration of the speech item. The push-to-talk button is not shown in FIG. 4.

The function of a controller 403 is to control the operation of the radio unit. The controller 403 is connected to the user interface 405, from which it receives impulses e.g. for starting and ending a call. The controller 403 can also give the user, via the user interface 405, acoustic or visual signals that relate to the operation of the mobile phone and/or the mobile telephone system.

The controller 403 is connected to the transceiver TX/RX 401. The channel used by the transceiver is allocated by the controller 403, i.e. the transceiver 401 tunes to the channel, or radio frequency, and a suitable time slot, allocated by the controller 403. The transceiver 401 is also activated by the controller 403. The controller 403 receives and transmits signalling messages through the transceiver 401. A communicating radio unit or mobile station 400 of the invention can be used e.g. in a radio system that comprises a radio network with at least one base station, mobile stations, and optionally one or more repeater stations that forward traffic between at least one base station and the subscriber stations. The communicating mobile station here comprises a memory means 409, a transceiver 401, and a controller 403 for controlling the operation of the mobile station.

The invention relates to a mobile station of a mobile communication system communicating in a group call, the mobile station comprising a transceiver for sending transmissions in a frame structure that comprises: time slots that are employed by the second mobile station sending a group call speech item in its speech item, and time periods that are common to mobile stations that are not sending a speech item, for transmission of signalling messages to the network infrastructure.

In the following we shall primarily describe a mobile station that operates in the same way as the third mobile stations described above in connection with the method steps operate. The mobile station of the invention comprises a control unit C1, responsive to a control message sent by the mobile communication system, for preventing transmission of signalling messages in the time slots or time periods allocated to the first mobile station and indicated by said control message.

In response to a control message sent by the network infrastructure, the memory unit 409 of the mobile station is arranged to store in its memory means 409 data indicating that a certain time period of the frame structure of the system is allocated to some other mobile station, i.e. to the first mobile station in the method steps.

In the following we shall primarily describe a mobile station that operates in the same way as the first mobile station described above in connection with the method steps operates.

In response to a control message sent by the mobile communication system, the transceiver 401 of this prioritized mobile station is arranged to send its signalling message during a time period indicated in the control message.

In response to a transmission prompt sent by the mobile communication system, the transceiver 401 of this prioritized mobile station is arranged to start sending its transmissions in the time slots indicated by the transmission prompt contained in the control message.

FIG. 5 is a diagram illustrating a situation in which, in accordance with the invention, a priorized mobile station 501 is given a chance to transmit position data at frequent intervals. In a mobile communication system it may happen that a mobile station 501 loses a call. In particular, this may happen if transmission trunking or quasi-transmission trunking is used for channel allocation in the mobile communication system. Because of this, if one wants to ensure that a mobile station in an emergency really participates in a call all the time, then the mobile station must be required to send a presence indication at regular intervals. If it is found out that the mobile station is not participating in the call, then the mobile communication system, typically the exchange of the system, can start informing of the call on a control channel, since a mobile station that has withdrawn from a call is likely to return to the control channel after losing the call. In addition, the periodic indication of the presence is operatively useful, for example, since it makes it possible to inform a dispatcher listening to an emergency call that the radio connection with the mobile station of a subscriber in an emergency has not been lost.

If a positioning means (AVL-GPS), GPS (Global Positioning System) is available, its transmission frequency can be increased in an emergency by using this invention, so that any changes in the location of the mobile station are recorded accurately. A signalling instant allocated to a mobile station can be used for transmitting this kind of information when it is not necessary to use the signalling instant for pre-emption. The difference between the transmission of location data in a standard situation and in an emergency is shown in FIG. 5. It appears from the figure that, if desired, it is possible to give the mobile station a chance to send its position data to the system more often when it is participating in a group call. This is particularly important when the mobile station is, for example, in an emergency.

Figure 6:
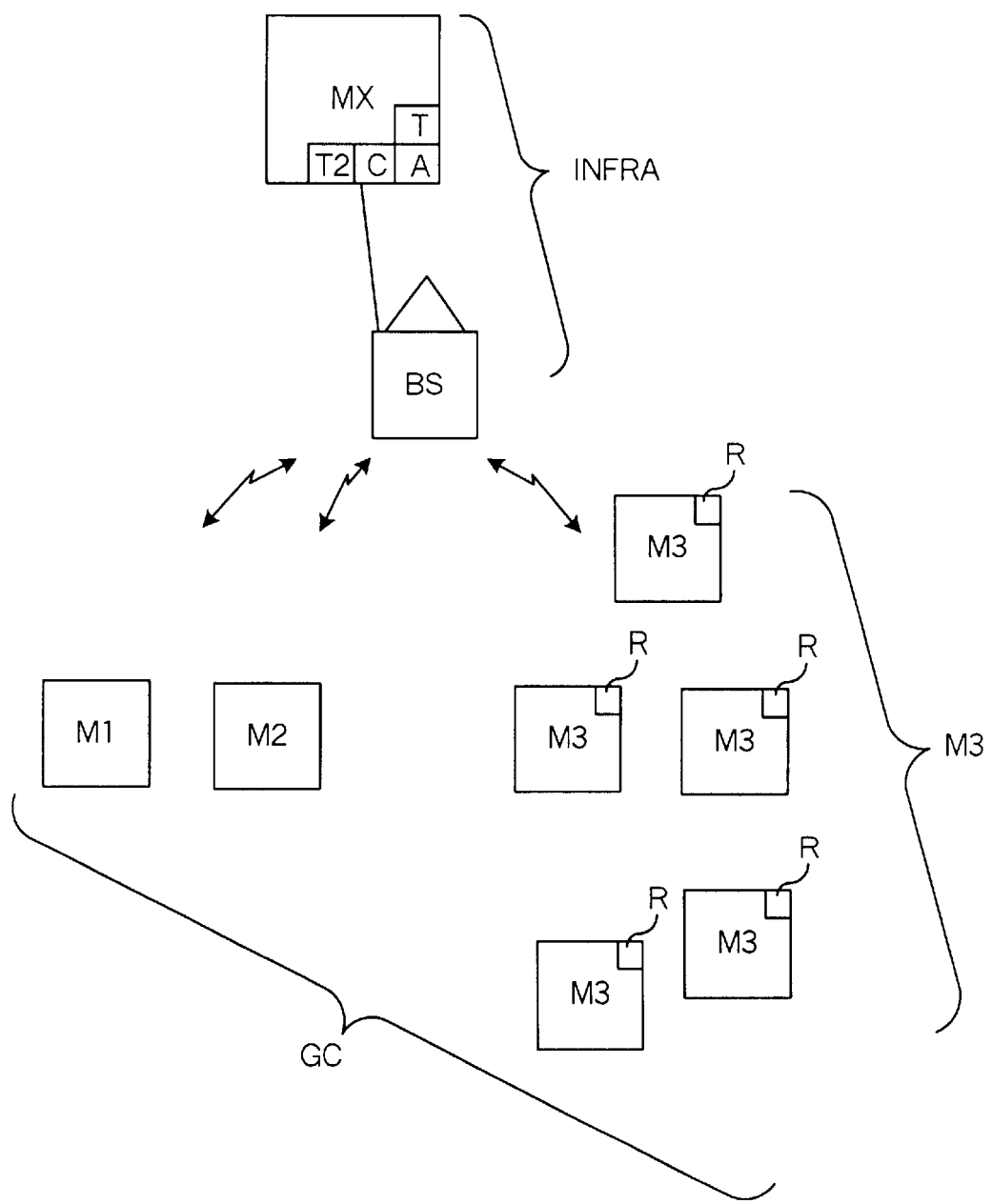
FIG. 6 shows a block diagram of a mobile communication system of the invention.

FIG. 6 is a block diagram of a mobile communication system of the invention. The invention relates to a mobile communication system comprising a first M1 and a second M2 mobile station and third M3 mobile stations, and network infrastructure INFRA comprising an exchange MX for forwarding group calls and transmissions and for maintaining a group call GC, the mobile stations M1, M2 and M3 that participate in the group call communicating in speech items, and a base station BS for maintaining the frame structure, which comprises time slots employed by the second mobile station M2, which is sending a speech item, in its speech item. The inventive mobile communication system further comprises allocation means A for allocating time slots or a time period only to the first mobile station M1, so that only the first mobile station M1 can send signalling messages in certain time slots or time periods to said network infrastructure.

The mobile communication system of the invention further comprises transmission means T for sending the first mobile station M1 and the third mobile stations M3 data in a control message indicating in which time slots or time periods only the first mobile station M1 can transmit. The inventive mobile communication system further comprises control means R in the third mobile stations for preventing transmission of signalling messages in the time slots or time periods allocated to the first mobile station M1.

The frame structure of the mobile communication system comprises time periods that are common to the first mobile station M1 and the third mobile stations M3 for transmission of signalling messages to the base station BS.

In the inventive mobile communication system, allocation means A are arranged to allocate a certain time period of the common time periods only to the first mobile station M1 for transmission of signalling messages, and transmission means T are arranged to send the third mobile stations M3 a control message to the effect that a time period of the frame structure is allocated to the first mobile station M1.

The inventive mobile communication system further comprises control means C, responsive to a signalling message transmitted by the first mobile station M1, so as to instruct the second mobile station M2 to terminate its speech item, and transmission means T2, responsive to a signalling message transmitted by the first mobile station, so as to send a transmission prompt to the first mobile station.

The drawings and the above description are intended only to illustrate the idea of the invention. The method, mobile communication system and mobile station of the invention can vary in their details within the scope of the claims. Although the invention is described above mainly in connection with the TETRA mobile communication system, the invention can be used in other kinds of mobile communication systems as well.

We claim:

1. A method of maintaining a group call in a mobile communication system comprising a network infrastructure, and mobile stations that communicate with the network infrastructure over a radio path, whose frame structure comprises time slots, the method comprising:

establishing a group call in which a first mobile station is prioritized, the mobile stations that participate in the group call communicating in speech items, and the frame structure comprising time slots that a second mobile station sending a speech item employs in its speech item;

allocating only to the first mobile station time slots or time periods from the frame structure of said group call in which time slots or time periods only the first mobile station may send signalling messages to said network infrastructure; and sending the first mobile station and a third mobile station data indicating in which time slots or time periods only the first mobile station may send signalling messages to said network infrastructure, the third mobile station refraining from sending signalling messages in said time slots or time periods allocated to the first mobile station.

2. The method according to claim 1, wherein said establishing of said group call is performed so that said frame structure further comprises time periods that are common to the first mobile station and the third mobile station and are used for transmission of signalling messages to the network infrastructure;

allocating, in said allocation step, one or more of said common time periods only to the first mobile station for the transmission of signalling messages;

transmitting, in said transmission step, allocation data from said network infrastructure to the first mobile station and the third mobile station to the effect that said time periods of said frame structure are allocated to the first mobile station; and in response to said allocation data, the third mobile station refraining from sending transmissions during said time period.

3. The method according to claim 2, in response to the second mobile station terminating the speech item, the method further comprises:

allocating, in said allocation step, after the termination of said speech item of the second mobile station, a desired number of time slots or time periods from a time period of the frame structure that is of a desired length to said third mobile station participating in the group call for transmission of signalling messages;

allocating, in said allocation step, a certain time period from said time period of a desired length only to the first mobile station for transmission of signalling messages;

transmitting, in said transmission step, to the mobile stations participating in said group call a first notification to the effect that said time slots or time periods of said frame structure are allocated only to the mobile stations participating in said group call;

transmitting, in said transmission step, to the first mobile station a second notification to the effect that said certain time period of said frame structure is allocated to the first mobile station, wherein in response to the first notification, the mobile stations that participate in said group call being able to send a signalling message during said time slots or time periods, and in response to the second notification, the first mobile station being able to send its transmission during said time period.

4. The method according to claim 3, wherein in response to the first notification, the mobile stations that participate in said group call store data indicating which time slots or time periods of said frame structure are allocated to the mobile station participating in said group call.

5. The method according to claim 3, wherein in response to the second notification, the first mobile station stores in memory data indicating which time period of said frame structure is allocated to the first mobile station.

6. The method according to claim 2, wherein the third mobile station, in response to said allocation data, stores information in memory to the effect that said time period of said frame structure is allocated to the first mobile station.

7. The method according to claim 2, further comprising:

instructing the second mobile station to terminate the speech item in response to said signalling message sent by the first mobile station;

sending a transmission prompt to the first mobile station; and sending first mobile station transmissions in time slots indicated by the transmission prompt.

8. The method according to claim 1, wherein said time periods are time slots of said frame structure, or parts of such time slots.

9. The method according to claim 1, further comprising:

transmitting said allocation data or second notification to the first mobile station, wherein in response to said allocation data or second notification, the first mobile station being able to transmit a signalling message to said network infrastructure during said time period.

10. The method according to claim 1, wherein said signalling messages are speech item request signals.

11. The method according to claim 1, wherein said signalling messages are packet form data.

12. The method according to claim 11, further comprising:

transmitting, by the first mobile station, part of the data to be transmitted in said signalling message, whereby part of the data to be transmitted does not fit into the first time period used;

requesting the network infrastructure to allocate more time to the first mobile station in said frame structure for transmission of the remaining data from the first mobile station to the network infrastructure;

allocating additional time from said frame structure to the first mobile station in the network infrastructure for transmission of the remaining data; and transmitting a notification of the allocated additional time to the first mobile station and the third mobile station.

13. The method according to claim 12, wherein a desired time period is allocated from said frame structure to the first mobile station for transmission of the remaining data.

14. The method according to claim 12, wherein one or more time slots are allocated from said frame structure to the first mobile station for transmission of the remaining data.

15. The method according to claim 1, wherein said signalling messages are status information messages.

16. The method according to claim 1, wherein said signalling message comprises position data indicating the location of the first mobile station.

17. A mobile communication system comprising first, second and third mobile stations, a mobile exchange for relaying group calls and transmissions and for maintaining a group call, said mobile stations that participate in said group call communicating in speech items, a base station for maintaining a frame structure comprising time slots that the second mobile station sending a speech item employs in a speech item, the mobile communication system comprising:
- allocation means for allocating time slots or a time period from the frame structure of said group call, so that only the first mobile station can send signalling messages in certain time slots or time periods to said mobile exchange;
- a first transmission means for sending the first mobile station and the third mobile station data in a control message indicating in which time slots or time periods only the first mobile station may transmit; and
- a first control means in said third mobile station for preventing transmission of signalling messages in said time slots or time periods allocated to said first mobile station.

18. The mobile communication system according to claim 17, wherein said frame structure comprises time periods that are common to the first mobile station and the third mobile station for transmission of signalling messages to said base station, wherein said allocation means are arranged to allocate a certain time period of said common time periods only to the first mobile station for transmission of signalling messages, and said transmission means are arranged to send the third mobile station a control message to the effect that said time period of said frame structure is allocated to the first mobile station.

19. The mobile communication system according to claim 17, further comprising:
- a second control means, responsive to said signalling message sent by the first mobile station, for instructing the second mobile station to terminate the speech item; and
- a second transmission means, responsive to said signalling message sent by the first mobile station, for sending a transmission prompt to the first mobile station.

20. A mobile station of a mobile communication system communicating in a group call, the mobile station comprising:
- a transceiver for sending transmissions in a frame structure comprising time slots that a second mobile station sending a speech item in a group call employs in a speech item, and time periods that are common to the mobile stations that are not sending a speech item, for transmitting signalling messages to a network infrastructure;
- a first control unit;
- a user interface;
- a memory unit; and
- a second control unit, responsive to a control message sent by said mobile communication system, for preventing transmission of signalling messages in the time slots or time periods allocated to a first mobile station as indicated in said control message.

21. The mobile station according to claim 20, wherein in response to said control message, said memory unit is arranged to store information to the effect that said time period of said frame structure is allocated to some other mobile station.

22. A mobile station of a mobile communication system, communicating in a group call, the mobile station comprising:
- a transceiver for sending transmissions in a frame structure comprising time slots that a second mobile station sending a speech item in a group call employs in a speech item, and time periods that are common to the mobile stations that are not sending a speech item, for transmitting signalling messages to the network infrastructure;
- a control unit;
- a user interface;
- a memory unit, wherein in response to a control message sent by said mobile communication system, the transceiver of the mobile station is arranged to send a signalling message during the time period of the frame structure of said group call indicated in the control message.

23. The mobile station according to claim 22, wherein in response to a transmission prompt sent by said mobile communication system, said transceiver is arranged to start sending transmissions in time slots indicated in said transmission prompt.

* * * * *